(No Model.) 2 Sheets—Sheet 1.
C. FELTON.
MACHINE FOR MAKING KEYS.

No. 433,280. Patented July 29, 1890.

Witnesses
J. Edw. Maybee
W. G. McMillan

Inventor
Clement Felton
by Donald C. Ridout & Co
Attys (No Model.)  2 Sheets—Sheet 2.

C. FELTON.
MACHINE FOR MAKING KEYS.

No. 433,280.  Patented July 29, 1890.

Witnesses  Inventor

UNITED STATES PATENT OFFICE.

CLEMENT FELTON, OF TORONTO, ONTARIO, CANADA.

MACHINE FOR MAKING KEYS.

SPECIFICATION forming part of Letters Patent No. 433,280, dated July 29, 1890.

Application filed September 30, 1889. Renewed June 26, 1890. Serial No. 356,784. (No model.)

*To all whom it may concern:*

Be it known that I, CLEMENT FELTON, locksmith, of the city of Toronto, in the county of York, in the Province of Ontario, Canada, have invented a certain new and Improved Machine for the Manufacture of Keys, of which the following is a specification.

The object of the invention is to design a machine to cut slots in keys, so that every key produced shall be different from the others; and it consists, essentially, of a series of circular cutters carried on a revolving spindle and worked in conjunction with a series of key-holders carried on adjustable slides and provided with adjusting mechanism arranged in connection with index-disks, by which the positions of the keys in relation to the cutters may be easily regulated and indicated, the whole being constructed substantially as hereinafter more particularly explained.

Figure 1:
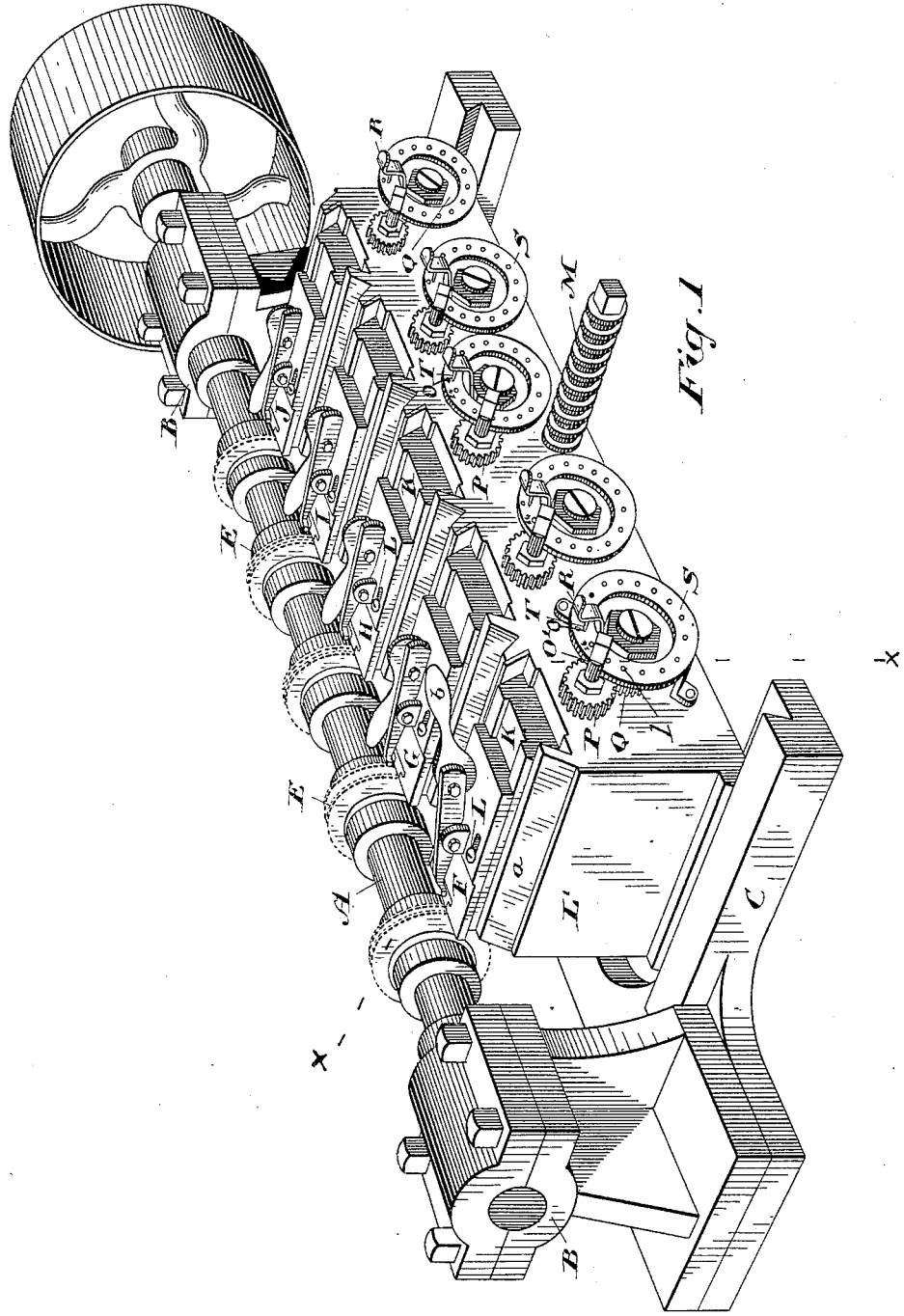
Figure 2:
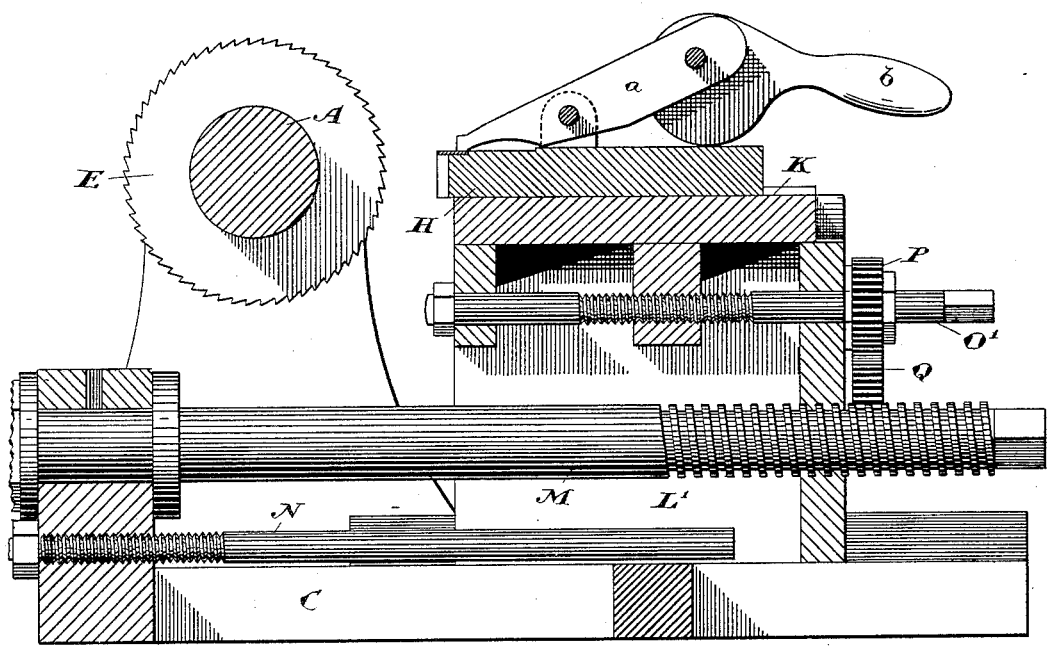

Figure 1 is a perspective view of my improved machine, showing five key-holders with corresponding cutters. Fig. 2 is a sectional view taken on line $x\ x$ of Fig. 1.

In the drawings, A represents a spindle or shaft carried in substantial bearing-boxes B, fixed to a suitable bed-plate C. This spindle is driven by a driving-pulley, which derives motion from any suitable motor. I show five cutters E, fixed to the spindle A. I also show five key-holders—one for each cutter—and marked, respectively, F, G, H, I, and J. The bed-plates of these holders are each adjustably connected to a slide K, being held by screws L, passing through longitudinal slots made in the said bed-plate.

The blanks out of which the keys are to be made are each fitted into a recess made in the bed-plate of its respective holder and is secured in position by the point of the pivoted lever $a$, which is operated by the eccentric lever $b$, designed so that it will impart the necessary force to hold the blank in position while being operated upon. The slides K are each fitted into suitable guideways formed in the cross-head L', which is itself carried in suitable guideways formed on the bed-plate C, and is provided with a screw M, by which it may be adjusted toward or from the cutters E, a suitable adjustable stop N being located, as indicated, for the purpose of preventing the cross-head L' from approaching the cutters E nearer than is desired.

Each of the slides K is provided with an adjusting-screw O', which has fixed to it a spur-pinion P, which meshes with a spur-wheel Q, loosely journaled on a stud and having a spring-finger R fixed to it.

In front of each of the spur-wheels Q, I fix on the face of the cross-head L' a dial-plate S, having, say, twenty-five holes made in its face to receive a pointer T, fixed to a spring-finger R. Each hole has an indicating-number, say, from 0 to 24; but I do not wish to confine myself to any particular number of holes or numbers, nor do I wish to limit myself to any particular number of key-holders and corresponding cutters.

Having described the general construction of my improved machine, I shall proceed to explain its operation: For that purpose we will assume that the pointer T, on each of the spring-fingers R, is fitted into the hole in the dial-plate S, (indicated by 0,) and that each of the key-holders F has been properly adjusted. A key-blank is placed, say, in the key-holder F. The eccentric-lever $b$ of the said holder F is adjusted so as to force the end of the pivoted lever $a$ against the blank, holding it securely in the recess made to receive it. The spindle A being put into operation, the adjusting-screw M is turned so as to move the cross-head L' toward the cutters E, which cut into the blank the particular slot or slots it is designed to form. The blank thus operated upon is then moved into the key-holder G, secured therein by its pivoted lever $a$, and a fresh blank is placed in the key-holder F. The pointer T, which at this period is fitting into the hole marked 0 on the dial-plate S of the slide carrying the key-holder F, is withdrawn, and the screw O' of the said slide is adjusted until the pointer T reaches the hole marked 1 in its dial-plate, where it springs in and is locked. The adjusting-screw M is then moved so as to once more carry the cross-head L' toward the revolving cutters. The cutter which operates in conjunction with the key-holder F will cut a slot in the fresh blank held by the key-holder F in a similar position, but at a different depth, than had been made in the previous blank, and at the same time a fresh slot or slots will be formed in the blank held by the key-holder G. The operation is then repeated until the blank which was first placed in the key-holder F has reached the key-holder J, by which time all the slots in the blank have been completed and the key is finished.

As every time that a blank is placed in a key-holder which has previously held a blank its adjusting-screw O' is moved one or more holes and is held during the cutting operation by its pointer T, fitting into one of the holes in the dial-plate S, no slot in any key formed in my machine can possibly correspond with the slot in any key made in the same key-holder, and consequently every key will be different. It will also be understood that millions of changes may be made by simply adjusting the pointer T on the dial-plate S, and it will be understood that I do not propose to make the changes regular. The only point which I shall observe is to see that every time a fresh blank is placed in any one of the key-holders one or more of the adjusting-screws O' will be moved, so that its respective pointer T will fit into a different hole in the dial-plate S, fresh combinations with the different dials being made every time that a key-blank is passed through the machine.

What I claim as my invention is—

1. In a machine having a series of cutters, a series of key-holders arranged one for each cutter and connected to an adjustable slide, in combination with gearing connected to the said adjusting-screw and provided with a pointer operating in conjunction with a stationary dial-plate having indicating-marks made on its surface, the whole being operated substantially as and for the purpose hereinbefore explained.

2. In a machine having a series of cutters, a series of key-holders arranged one for each cutter and each adjustably connected to a slide K, operated by an adjusting-screw O', having a pinion P fixed to it and meshing with a spur-wheel Q, having a spring-finger R fixed to it, with a pointer T arranged to fit into one of the holes in the dial-plate S, in combination with the cross-head L', provided with an adjusting-screw M, and operated in conjunction with an adjustable stop N, substantially as and for the purpose specified.

3. A bed-plate having a recess made in it to receive a key-blank, in combination with the pivoted lever $a$ and eccentric lever $b$, substantially as and for the purpose specified.

Toronto, August 6, 1889.

CLEMENT FELTON.

In presence of—
 CHARLES C. BALDWIN,
 W. G. MCMILLAN.